Feb. 21, 1956     L. H. PHELPS, JR     2,735,448

PIPE SPACING DEVICE

Filed Dec. 16, 1952

INVENTOR.
LEWIS H. PHELPS, JR.
BY
ATTORNEY

United States Patent Office 2,735,448
Patented Feb. 21, 1956

2,735,448

PIPE SPACING DEVICE

Lewis H. Phelps, Jr., Riverside, Conn., assignor to The Texas Company, New York, N. Y., a corporation of Delaware Application December 16, 1952, Serial No. 326,324

4 Claims. (Cl. 138—65)

This invention relates to a novel pipe spacing device of the type which is fitted around an internal pipe to space it within a surrounding casing. Such casings often are used for protecting oil or gas pipe lines where they pass under a railroad embankment or similar weighty obstruction. An important function of a pipe spacing device is to insulate the internal pipe electrically from the surrounding casing so as to reduce electrolytic corrosion and to reduce the power requirements when cathodic protection is applied to the pipe line. Consequently, pipe spacing devices are usually constructed of materials which have electrically insulating properties, and which have low moisture absorption characteristics. Among materials which can be used successfully are hard rubber and phenolic condensation products such as Bakelite type resins.

One type of pipe spacing device which has been used successfully is shown in U. S. reissue patent No. Re-23,545, dated September 9, 1952. A plurality of blocks of electrically insulating material are located at circumferentially spaced points around the outside of a pipe, and are secured together and held firmly on the pipe by a pair of connectors such as cables or bars which pass through the several blocks and are tensioned by bolt and nut connections.

I have found that while such pipe spacing and insulating devices are generally satisfactory, they do suffer from certain disadvantages. Time-consuming and laborious operations are required for tightening the device on the outside of a pipe. Furthermore, each pipe spacing device must be made for a pipe of a specific diameter, with only a very small tolerance in diameter being allowable. Also, in order to prevent twisting of the pipe spacing blocks on a pipe as the latter is inserted into a casing, it heretofore has been necessary to use two longitudinally spaced connectors, whereas a single connector otherwise would suffice.

In accordance with the present invention there is provided a novel pipe spacing device which is adapted to be secured more rapidly and easily around the outside of a pipe than was possible heretofore and which can be applied to pipes having a wide variety of diameters. My novel device also is designed so that but a single connector for several blocks may be employed without permitting them to twist during installation of a pipe within a casing.

The novel features of the invention will be described in detail below with reference to the drawings, in which.

Figure 1:
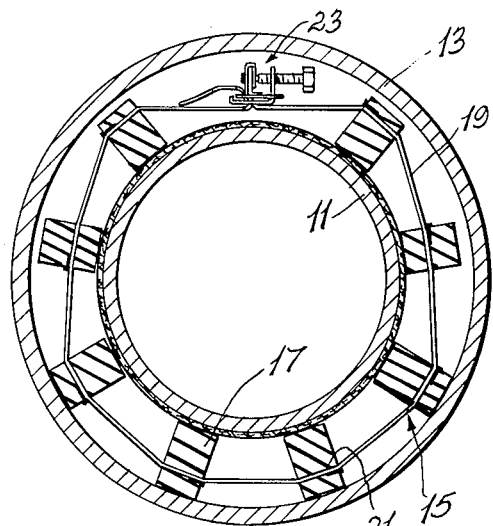
Fig. 1 is a cross-sectional view, parts being in elevation, showing my novel pipe spacing device secured to an internal pipe which is located within an external casing.

Referring to Figs. 1–4 of the drawings there is shown an internal pipe 11 spaced within an external casing 13 by a pipe spacing device 15 comprising a plurality of circumferentially spaced longitudinally extending parallel blocks or bars 17 of electrically insulating and moisture resistant material. Blocks 17 are long and narrow with rectangular or square cross sections, and have tapered ends to facilitate insertion into a casing. All of the spacer blocks 17 are connected together by a circumferentially extending flexible connector such as a wide thin strap 19 which passes through correspondingly shaped openings in the form of wide thin slots 21 in the several spacer blocks, the fit being tight enough to prevent sideways twisting of the block on the strap. Slots 21 advantageously are about half as long as the blocks, for example being about three inches long for a block seven inches long. The ends of the strap 19 are secured together by strap fastening and tensioning means 23 at the top of the pipe 11.

Figure 2:
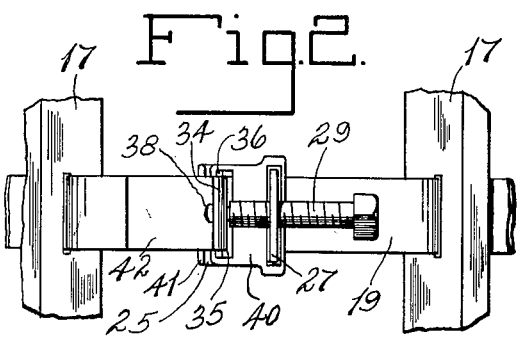
Fig. 2 is an enlarged plan view of the pipe spacing device shown in Fig. 1.
Figure 3:
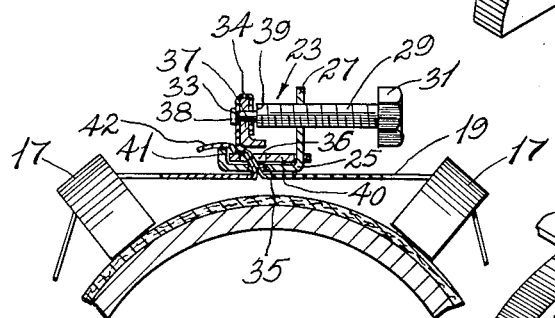
Fig. 3 is an enlarged cross-sectional view, parts being in elevation, of a part of the pipe spacing device of Fig. 1.
Figure 4:
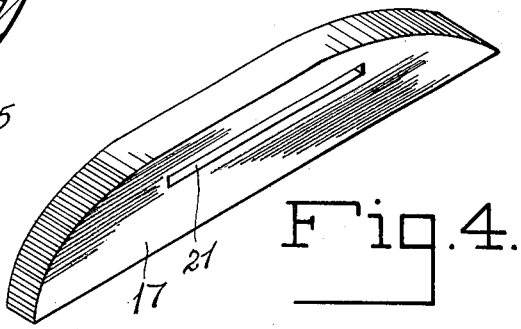
Fig. 4 is a perspective view of one form of pipe spacing block of my invention.

As shown in detail in Figs. 2 and 3 the strap fastening and tensioning means 23 comprises a base plate 25 having an upstanding flange 27 within which is threaded a screw 29 having a polygonal tool engaging head 31 on the outside of flange 27, and having a shank 33 of reduced diameter at its opposite end. One end 34 of strap 19 passes up through transverse coinciding openings in the form of slots 35 and 36 in the base and a floating plate 40, and is turned down over an upstanding washer plate 37. A bore extends transversely through both the end of strap 19 and the plate 37, both of which thereby are captured loosely on the shank 33 of screw 29 between a head 38 and a shoulder 39. Thus, when screw 29 is turned in flange 27, the washer plate 37 and accompanying portion of strap 19 move in or out with the screw, without rotating. The opposite side of base plate 25 is provided with another upstanding flange 41 of lesser height than flange 27, and having its top approximately level with the bottom of the washer plate 37 and positioned in the path of movement of plate 37. The second end 42 of strap 19 passes up through the slots 35 and 36 in juxtaposition to the opposite end portion 34, is manually pulled up to secure an initial degree of tightness of the strap around the pipe, and is then doubled back in reversely extending relation over the flange 41. Thus, one pipe spacing device may be applicable to a wide variety of pipe sizes simply by manually pulling the strap end through as necessary.

After manually tightening strap 19 as much as possible, a wrench is applied to the head 31 and the screw 29 is turned through the flange 27 to shift the washer 37 and the corresponding end of the strap from a first position adjacent flange 27 toward a second position, spaced from the flange, so as to increase the tension on the strap to the desired degree. The free end 42 of strap 19 is wedged firmly in position against flange 41, which acts as a gripping abutment when the washer member 37 and accompanying strap pass over the flange 41, thus insuring that the pipe spacing device will be retained tightly in position around the pipe.

Figure 5:
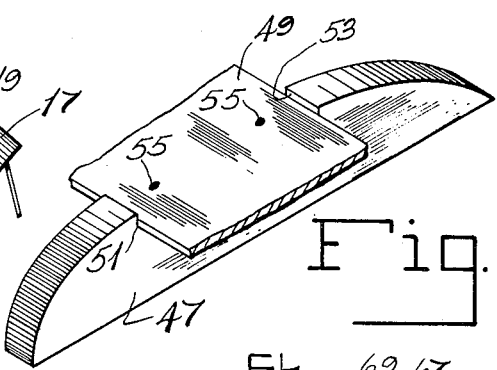
Fig. 5 is a perspective view showing another form of pipe spacing block of my invention, secured to a connector.

Another way for securing a pipe spacer block 47 to a strap 49 is shown in Fig. 5. Block 47 has an opening in the form of a shallow recess 51 in its outer surface somewhat deeper than the strap's thickness, provided with side walls 53 which fit snugly against the sides of the strap and thus restrain the block from twisting on the strap. Suitable auxiliary fastening devices may be passed through the strap 49 into the block, such as the longitudinally spaced rivets 55, to hold the blocks and strap together before application to the pipe as well as to assist in preventing twisting of the blocks on the strap during insertion of a pipe within a casing.

Figure 6:
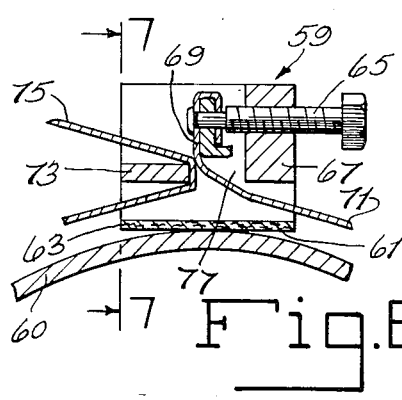
Fig. 6 is a cross-sectional view taken along the line 6—6 in Fig. 7 showing a modified form of connector coupling.
Figure 7:
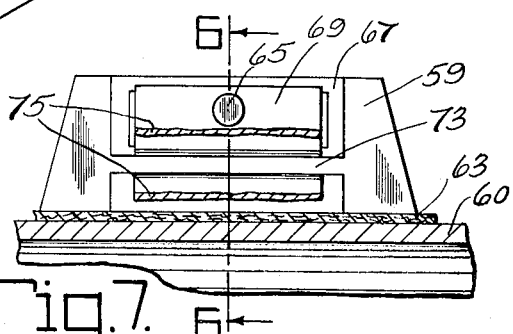
Fig. 7 is a sectional view taken along the line 7—7 in Fig. 6.

In a modified form of strap fastening mechanism shown in Figs. 6 and 7 the same general principles are employed as described in connection with Figs. 1 to 4. However, instead of using a strap fastening and tensioning means which is spaced from the pipe as shown in Fig. 1, the operating mechanism is located in a long narrow block 59 extending longitudinally of the pipe 60 parallel to the spacer blocks, and having a bottom surface 61 which rests on the pipe. High strength is obtained by making the block 59 of a metal such as steel, and providing a pad 63 of electrically insulating material such as rubber or the like as the bottom surface of the block.

A screw 65 operates within a longitudinally extending bar 67 to move the end 69 of the strap 71 toward and away from a second oppositely disposed bar 73 around which is wrapped the opposite end 75 of the strap. After initially pulling the end 75 up through a slot 77 between the two bars 67 and 73, further tightening of the strap is accomplished by turning the screw 65 so as to move the end 69 of the strap across the bar 73 to wedge against the end portion 75 of the strap in a manner similar to that described in connection with Fig. 1.

The principles of the invention have been described primarily as applied to the single connector strap for holding a plurality of spacer blocks on a pipe. It is apparent that some of the novel features are also advantageous when two or more connectors are used.

Obviously, many modifications and variations of the invention as hereinabove set forth, may be made without departing from the spirit and scope thereof, and therefore only such limitations should be imposed as are indicated in the appended claims.

I claim:

1. A pipe spacing device adapted to be secured around the outer surface of a pipe comprising a wide strap having first and second ends; a plurality of pipe spacing blocks carried by said strap; and strap-fastening and tensioning means including a part secured to said first end, said means having a slot therein for receiving said second end whereby said pipe spacing device may be adapted for positioning around a pipe by manually pulling said second end through said slot until an initial degree of tightness is obtainable, and said means comprising tensioning mechanism operable for further tensioning said strap beyond said initial degree.

2. A pipe spacing device in accordance with claim 1 comprising only a single wide strap, said blocks being secured to said strap against twisting in the plane of the width of said strap.

3. A pipe spacing device in accordance with claim 1 wherein said strap-fastening and tensioning means comprises tensioning mechanism connected with said first end and movable to shift said first end from a first position toward a second position to increase the tension on said strap, and gripping abutment means adjoining said slot and positioned in the path of movement of said tensioning mechanism, said abutment means being adapted to receive said second end of said strap thereabout in reversely extending relation, said tensioning mechanism and said abutment means cooperating with one another to grip an opposed portion of said strap therebetween.

4. A pipe spacing device in accordance with claim 1 wherein said strap-fastening and tensioning member is a block adapted to rest on a pipe surface, said block comprising a metal bar having said slot therein and carrying said tensioning mechanism, and a layer of electrically insulating material extending across the bottom surface thereof.

References Cited in the file of this patent

UNITED STATES PATENTS

| | | |
|---|---|---|
| 1,122,130 | Lamson | Dec. 22, 1914 |
| 2,004,626 | Hann | June 11, 1935 |
| 2,159,622 | Sanford | May 23, 1939 |
| 2,287,056 | Owens | June 23, 1942 |
| 2,420,800 | Smith | May 20, 1947 |
| 2,423,986 | Lathrope | July 15, 1947 |
| 2,551,867 | Bond | May 8, 1951 |